(12) United States Patent
Iwabuchi

(10) Patent No.: US 10,596,859 B2
(45) Date of Patent: Mar. 24, 2020

(54) PNEUMATIC TIRE

(71) Applicant: BRIDGESTONE CORPORATION, Chuo-ku, Tokyo (JP)

(72) Inventor: Sotaro Iwabuchi, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 364 days.

(21) Appl. No.: 15/519,556

(22) PCT Filed: Oct. 6, 2015

(86) PCT No.: PCT/JP2015/078385
§ 371 (c)(1),
(2) Date: Apr. 17, 2017

(87) PCT Pub. No.: WO2016/067856
PCT Pub. Date: May 6, 2016

(65) Prior Publication Data
US 2017/0246919 A1 Aug. 31, 2017

(30) Foreign Application Priority Data
Oct. 27, 2014 (JP) .................................. 2014-218555

(51) Int. Cl.
*B60C 13/00* (2006.01)
*B60C 13/02* (2006.01)

(52) U.S. Cl.
CPC ............ *B60C 13/02* (2013.01); *B60C 13/001* (2013.01)

(58) Field of Classification Search
CPC ..... B60C 13/00; B60C 13/001; B60C 13/002; B60C 13/003; B60C 13/02; B60C 13/023
See application file for complete search history.

(56) References Cited

U.S. PATENT DOCUMENTS

| | | |
|---|---|---|
| 2010/0258231 A1 | 10/2010 | Nakamura |
| 2012/0273101 A1 | 11/2012 | Iwabuchi |
| 2015/0314652 A1 | 11/2015 | Iwabuchi |
| 2015/0314653 A1 | 11/2015 | Iwabuchi |

FOREIGN PATENT DOCUMENTS

| | | |
|---|---|---|
| CN | 103921627 A | 7/2014 |
| EP | 2502758 A1 | 9/2012 |
| EP | 3115230 A1 | 1/2017 |
| JP | H11-291722 A | 10/1999 |
| JP | 2011-116306 A | 6/2011 |
| JP | 2011-225026 A | 11/2011 |
| JP | 2014-042693 A | 3/2014 |
| JP | 2014-136487 A | 7/2014 |
| JP | 2014-162447 A | 9/2014 |

OTHER PUBLICATIONS

Search Report of the Chinese office action dated Aug. 9, 2018, from the SIPO in a Chinese patent application coresponding to the instant patent application.
International Search Report issued in International Application No. PCT/JP2015/078385 dated Nov. 24, 2015.
Extended European Search Report dated Oct. 11, 2017, issued in corresponding EP Patent Application EP 15854424.7.

*Primary Examiner* — Justin R Fischer
(74) *Attorney, Agent, or Firm* — Solaris Intellectual Property Group, PLLC

(57) ABSTRACT

Main ridges of a first direction ridge pattern 50 and a second direction ridge pattern 60 that are adjacent to one another are connected together. Due thereto, the main ridges are connected as one ridge from one end to another end of a decorative concave portion 48, and a continuous main ridge 51 is formed.

8 Claims, 6 Drawing Sheets

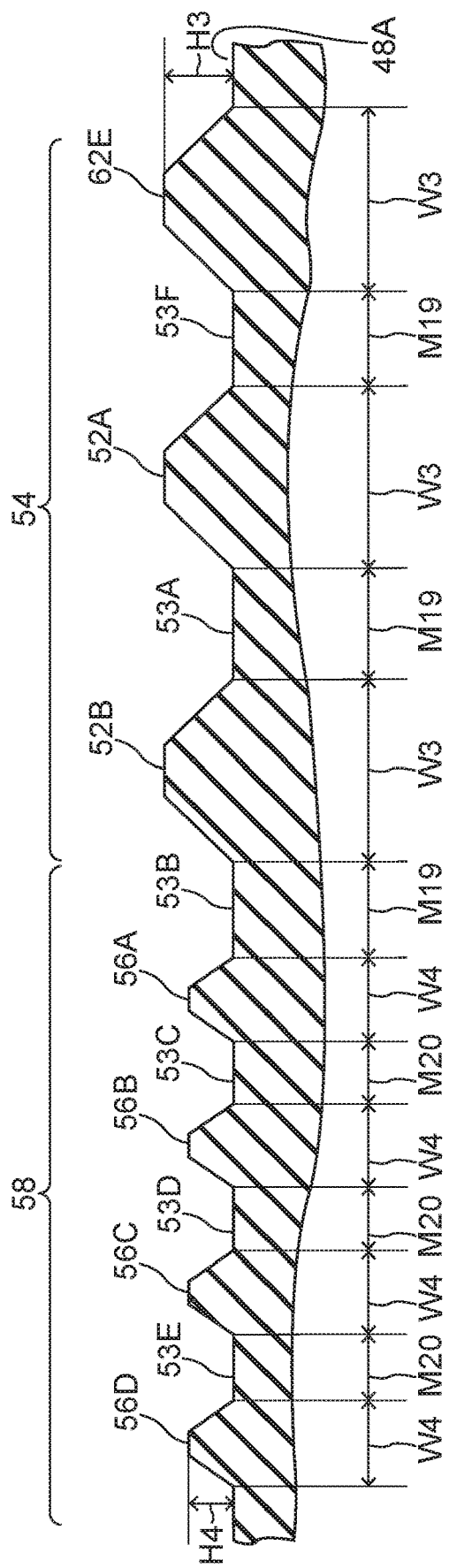

PNEUMATIC TIRE

TECHNICAL FIELD

The present invention relates to a pneumatic tire in which plural ridges are formed at a tire side portion.

BACKGROUND ART

The provision of side decorative bands, in which plural straight or curved ridges are arrayed in parallel, at the side portions of a tire has been carried out widely. Making the thickness of the tire sides thin in order to aim for decreased weight of the tire has been carried out, but, if the thickness of the tire sides is made thin, there are cases in which convexity and concavity, which is caused by the end portions of members such as the belts or the like, appears at the surfaces of the tire sides. The aforementioned side decorative belt is effective in making such convexity and concavity inconspicuous.

For example, a side decorative belt that is structured by decorative element A1, decorative element B1 and decorative element C1 is disclosed in Patent Document 1. By forming this side decorative belt at the tire side portion, the effect of making convexity and concavity of the side portion of the tire inconspicuous is achieved.

PRIOR ART DOCUMENTS

Patent Documents

Patent Document 1: Japanese Patent Application Laid-Open (JP-A) No. 2011-126335

SUMMARY OF INVENTION

Technical Problem

By the way, in a case in which a side decorative band is formed at a tire side portion, there is the need to carry out, on the mold that is used when vulcanizing the tire, convex/concave machining that makes the mold correspond to the side decorative band. At the time of carrying out this convex/concave machining, if the ridges break-off, each time a ridge breaks-off, the need arises to carry out vertical movement of the blade for machining, and the machining requires time and labor.

In view of the above-described circumstances, the subject of the present invention is the provision of a pneumatic tire in which convexity and concavity of a tire side portion is made inconspicuous, and a side decorative region of the tire side portion can be formed easily.

Solution to Problem

A pneumatic tire relating to a first aspect comprises: a first ridge portion having a plurality of first main ridges, which project-out from a bottom surface of a side decorative region formed in a tire side portion and extend in parallel in a first direction, and having a first connecting ridge, which extends in a direction intersecting the first direction and connects together end portions of the first main ridges that are adjacent; and a second ridge portion having a plurality of second main ridges, which project out from the bottom surface of the side decorative region and extend in parallel in a second direction that is different than the first direction, and having a second connecting ridge, which extends in a direction intersecting the second direction and connects together end portions of the second main ridges that are adjacent, wherein a plurality of continuous main ridges, in which the first main ridges and the second main ridges are disposed alternately and connected together, and that are continuous from one end to another end of the side decorative region, are formed.

In the pneumatic tire relating to the first aspect, the first ridge portion in which the first main ridges are formed and the second ridge portion in which the second main ridges are formed are disposed at the side decorative region of the tire side portion. The first main ridges extend in the first direction, and a plurality thereof are disposed in parallel. The first main ridges that are adjacent are connected to one another by the first connecting ridge and become a single ridge. The second main ridges extend in the second direction, and a plurality thereof are disposed in parallel. The second main ridges that are adjacent are connected to one another by the second connecting ridge and become a single ridge. Further, plural continuous main ridges, in which the first main ridges and the second main ridges are disposed alternately and connected together, and that are continuous from one end to the other end of the side decorative region, are formed.

In accordance with the present invention, light that is incident on the tire side portion can be reflected in multiple directions by the first main ridges and the second main ridges that extend in respectively different directions. Accordingly, at the tire side portion, a difference in shading that is due to the difference in the reflection of light (sunlight, ambient light, or the like) can be produced effectively.

Further, the continuous main ridges, in which the first main ridges and the second main ridges are connected and that are continuous from one end to another end of the side decorative band, are structured. Accordingly, there is no need for vertical movement of a blade for mold machining, and grooves for the first main ridges and the second main ridges can be machined easily.

A pneumatic tire relating to a second aspect further comprises a plurality of sub-ridges that project out from the bottom surface of the side decorative region, are disposed between the first main ridges and the second main ridges, extend in the first direction or the second direction, and are disposed in parallel to one another.

In accordance with the pneumatic tire relating to the second aspect, a difference in shading that is due to the difference in the reflection of light can be produced more effectively by the sub-ridges that extend in the first direction or the second direction.

A pneumatic tire relating to a third aspect has the feature that the first ridge portion and the second ridge portion are disposed alternately in a form of a lattice.

In accordance with the pneumatic tire relating to the third aspect, the first ridge portion and the second ridge portion, at which the extending directions of the ridges differ, are disposed alternately in the form of a lattice. Therefore, the difference in shading that is due to the difference in the reflection of light can be produced more effectively.

A pneumatic tire relating to a fourth aspect has the feature that an interval between the first main ridges that are adjacent to one another and an interval between the second main ridges that are adjacent to one another are wider than an interval between the sub-ridges that are adjacent to one another.

In accordance with the pneumatic tire relating to the fourth aspect, by making the interval between the first main ridges and the interval between the second main ridges wider than the interval between the sub-ridges, these portions can be made to look three-dimensional by utilizing the difference in the reflection of light that is due to the difference in the intervals.

A pneumatic tire relating to a fifth aspect has the feature that projecting heights of the first main ridges and the second main ridges from the bottom surface are higher than that of the sub-ridges.

In accordance with the pneumatic tire relating to the fifth aspect, the projecting heights of the first main ridges and the second main ridges from the bottom surface are higher than that of the sub-ridges. Therefore, these portions can be made to look three-dimensional by utilizing the difference in the reflection of light that is due to the difference in heights.

A pneumatic tire relating to a sixth aspect has the feature that the sub-ridges include first sub-ridges that are disposed at the first ridge portion and second sub-ridges that are disposed at the second ridge portion, and the first sub-ridges are formed so as to be continuous within the first ridge portion, and the second sub-ridges are formed so as to be continuous within the second ridge portion.

In accordance with the pneumatic tire relating to the sixth aspect, the sub-ridges as well are formed continuously as one sub-ridge within the first ridge portion and within the second ridge portion. Therefore, there is no need for vertical movement of a blade for mold machining within the range in which the sub-ridges are formed continuously, and grooves for the first sub-ridges and the second sub-ridges can be machined easily.

A pneumatic tire relating to a seventh aspect has the feature that the first direction and the second direction are orthogonal.

In accordance with the pneumatic tire relating to the seventh aspect, because the angle between the first direction and the second direction is 90°, the difference in shading that is due to the difference in the reflection of the light reflected by the respective regions can be produced more effectively.

Advantageous Effects of Invention

In accordance with the present invention, convexity and concavity of a tire side portion is made inconspicuous, and a side decorative band of the tire side portion can be formed easily.

BRIEF DESCRIPTION OF DRAWINGS

FIG. 5A is a cross-sectional view of a modified example of the side decorative portion of the tire of the present embodiment.

DESCRIPTION OF EMBODIMENTS

Figure 1:
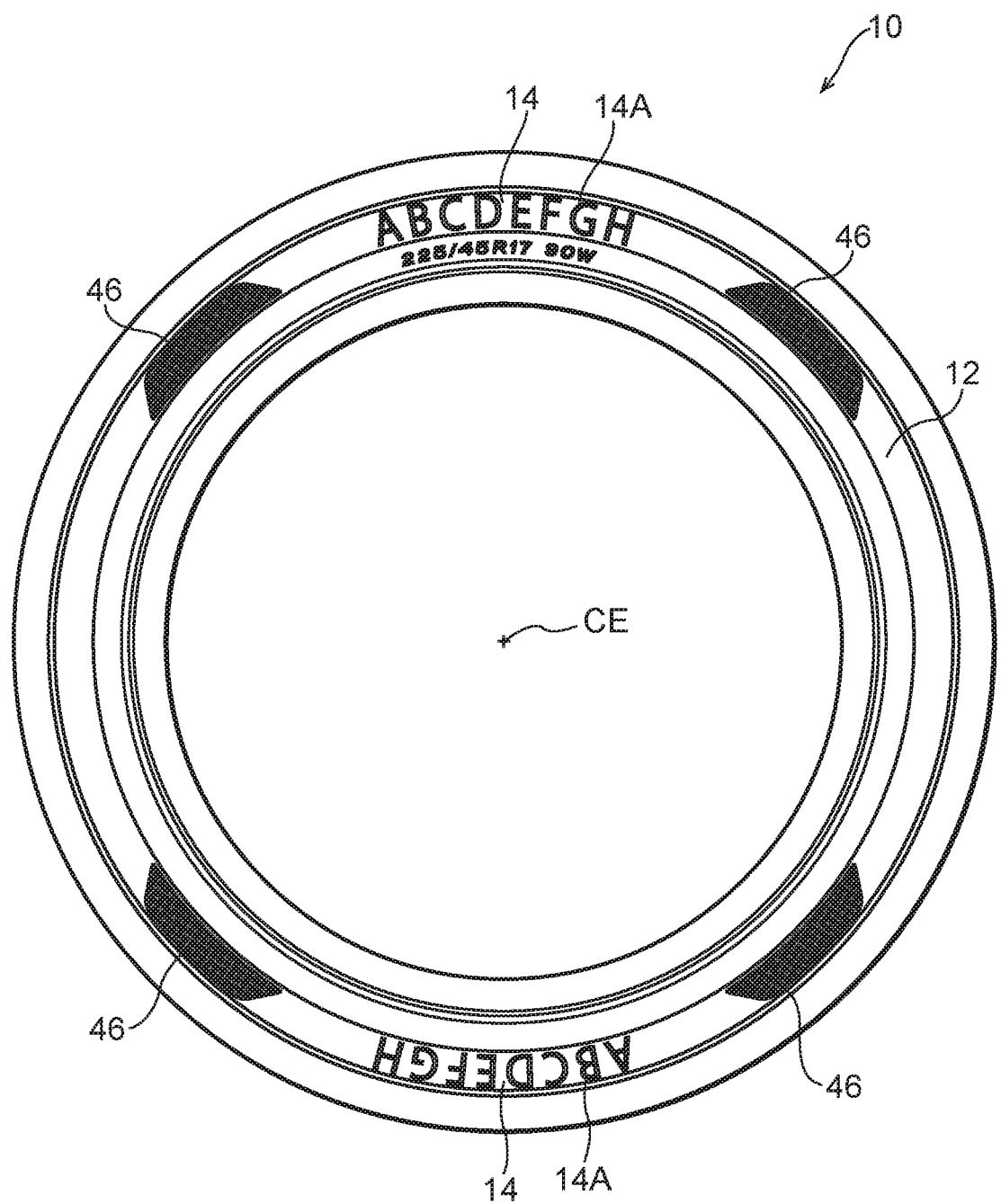
FIG. 1 is a side view of a pneumatic tire relating to a present embodiment.

An embodiment of the present invention is described hereinafter with reference to the drawings. A side view of a pneumatic tire 10 relating to the present embodiment is shown in FIG. 1. In the present embodiment, the tire peripheral direction is indicated by U, and the tire radial direction is indicated by R.

Emblem portions 14 and side decorative bands 46 are formed at a tire side portion 12 of the pneumatic tire 10.

The emblem portions 14 are made to be band-shaped circular-arc shapes, and are formed at two places at positions that are symmetrical with respect to a tire central axis CE (see FIG. 1). An emblem 14A is disposed at the emblem portion 14. The emblem 14A is expressed by characters such as "ABCDEFGH" for example that are marked on a smooth surface.

The side decorative bands 46 are made to be a circular-arc shapes that run along the tire peripheral direction U, and four thereof are formed so as to be adjacent to the respective both end portions of the emblem portions 14.

Figure 2:
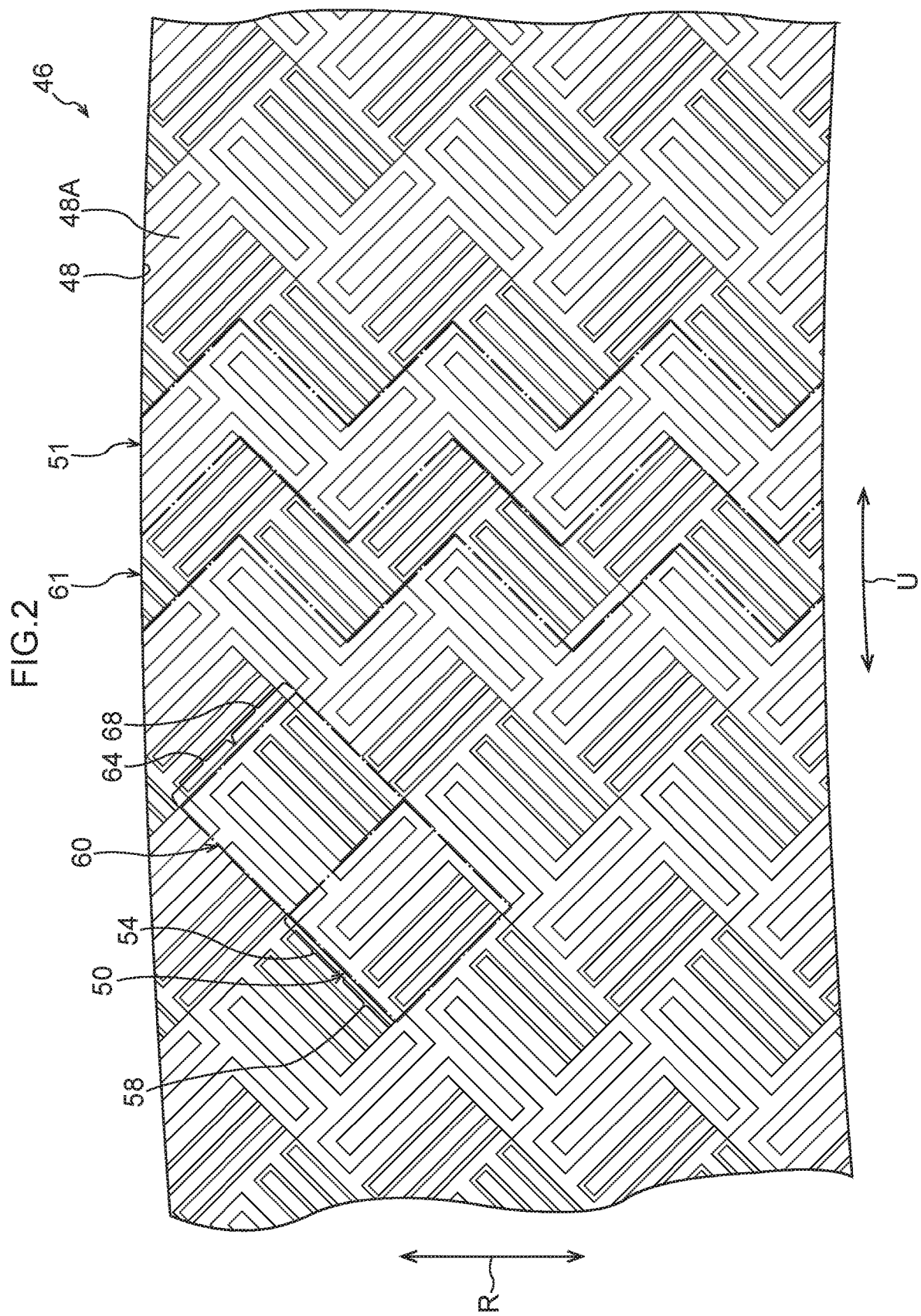
FIG. 2 is a portion of a side decorative portion of the pneumatic tire relating to the present embodiment.

As shown in FIG. 2, a decorative concave portion 48 is formed at the side decorative band 46. The decorative concave portion 48 is a shape that is recessed from the outer surface of the tire side portion 12, and structures the outer shape of the side decorative band 46. First direction ridge patterns 50 that serve as first ridge portions and second direction ridge patterns 60 that serve as second ridge portions are disposed alternately at a bottom surface 48A of the decorative concave portion 48. The first direction ridge patterns 50 and the second direction ridge patterns 60 are the same shapes and only the placement angles thereof differ.

Figure 3:
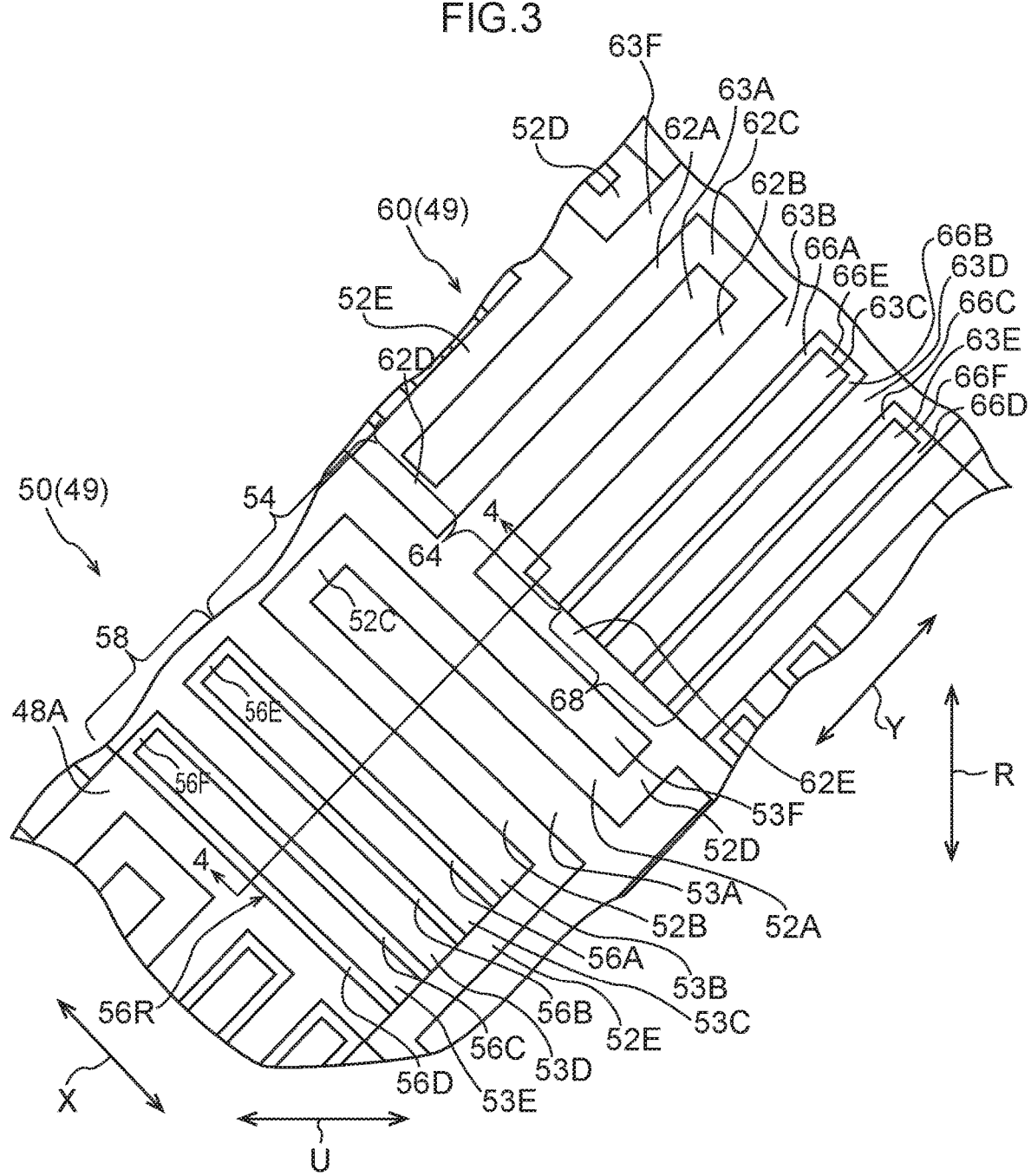
FIG. 3 is a partial, enlarged view of the side decorative portion of the pneumatic tire relating to the present embodiment.

The first direction ridge pattern 50 is substantially square, and, as shown in FIG. 3, is structured by a main ridge region 54 and a sub-ridge region 58 that are substantially rectangular.

Figure 4:
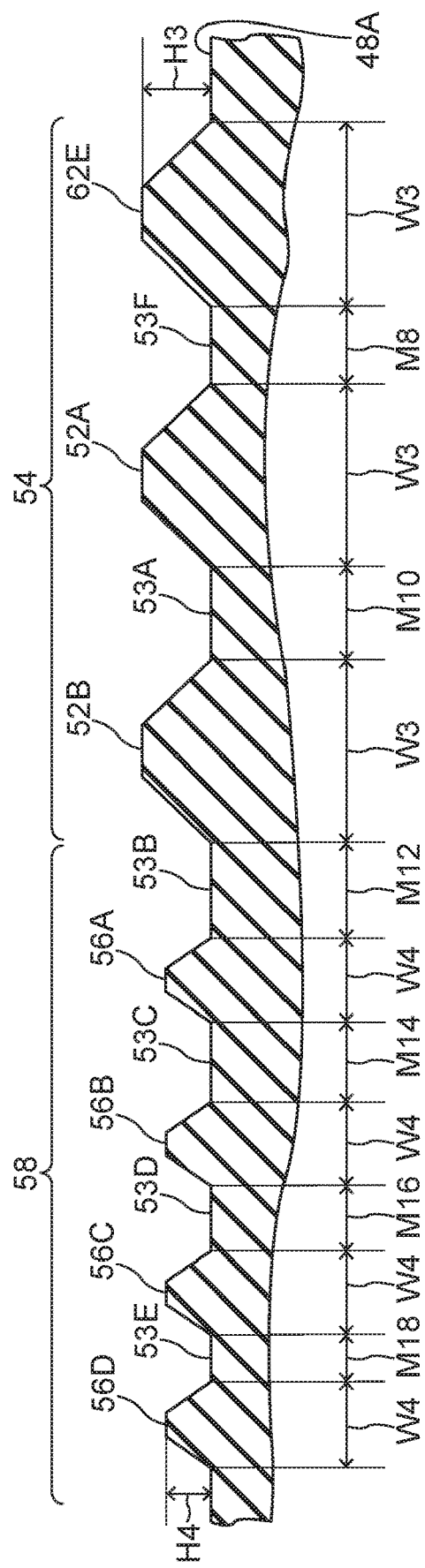
FIG. 4 is a cross-sectional view along line 4-4 of FIG. 3.

Three first main ridges 62E, 52A, 52B are disposed in parallel so as to be parallel to one another at the main ridge region 54. The first main ridges 62E, 52A, 52B extend in a first direction X that is inclined with respect to the tire peripheral direction U. The first main ridges 52A, 52B extend from one end side to the other end side of the square of the first direction ridge pattern 50. The first main ridge 62E extends from the one end side of the square of the first direction ridge pattern 50, and is connected to one end of a first main ridge 62B of the second direction ridge pattern 60. As shown in FIG. 4, the first main ridges 52A, 52B, 62E project-out from the bottom surface 48A at height H3. The height H3 is set within the range of 0.08 to 3.0 mm.

One end side of the first main ridge 52A and one end side of the first main ridge 52B are connected by an end portion ridge 52C. In the same way as the first main ridges 52A, 52B, the end portion ridge 52C projects-out at height H3 from the bottom surface 48A. The end portion ridge 52C extends from one end side of the first main ridge 52A to one end side of the first main ridge 52B, in the direction orthogonal to the first direction X. A substantially U-shaped ridge, which extends from another end side to one end side of the first direction ridge pattern 50 and is bent-back at the one end side and returns to the other end side, is formed by the first main ridges 52A, 52B and the end portion ridge 52C.

A short connecting ridge 52D is formed at the other end side of the first main ridge 52A. The short connecting ridge 52D is a portion of the adjacent second direction ridge pattern 60, and is bent at a substantial right angle from the other end of the first main ridge 52A toward the side opposite the first main ridge 52B, and is formed to the corner portion of the first direction ridge pattern 50. A second main ridge 52E is formed at the other end side of the first main ridge 52B. The second main ridge 52E also is a portion of the adjacent second direction ridge pattern 60, and is bent at a substantial right angle from the other end of the first main ridge 52B toward the side opposite the first main ridge 52A, and is formed to the corner portion of the first direction ridge pattern 50.

The cross-sectional shapes of the first main ridges 62E, 52A, 52B, the end portion ridge 52C, the short connecting ridge 52D and the second main ridge 52E are trapezoidal shapes that gradually become narrower from the bottom surface 48A, and the bottom surfaces thereof are width W3. The width W3 is set within the range of 0.08 to 3.0 mm.

At the sub-ridge region 58, four first sub-ridges 56A, 56B, 56C, 56D are formed in parallel so as to be parallel to one another. The first sub-ridges 56A, 56B, 56C, 56D project-out from the bottom surface 48A at height H4 that is lower than the height H3, and extend in the first direction X. Further, the other ends thereof are connected to the second main ridge 52E, and the one ends thereof extend to the other end side of the square of the first direction ridge pattern 50. The height H4 is set within the range of 0.05 to 2.0 mm.

One end side of the first sub-ridge 56A and one end side of the first sub-ridge 56B are connected by an end portion ridge 56E, and one end side of the first sub-ridge 56C and one end side of the first sub-ridge 56D are connected by an end portion ridge 56F. The end portion ridges 56E, 56F are disposed in the direction orthogonal to the first direction X. Substantially U-shaped ridges, which extend from the second main ridge 52E of the first direction ridge pattern 50 to the one end side and are bent-back at the one end side and return to the second main ridge 52E, are formed by the first sub-ridges 56A, 56B and the end portion ridge 56E, and the first sub-ridges 56C, 56D and the end portion ridge 56F, respectively. Further, at the other end side, the first sub-ridges 56A, 56B are connected via the second main ridge 52E, and the first sub-ridges 56C, 56D are connected via the second main ridge 52E. Due thereto, within the first direction ridge pattern 50, the region from the end portion, which is at the second main ridge 52E side, of the first sub-ridge 56A to the end portion, which is at the second main ridge 52E side, of the first sub-ridge 56D is a continuous sub-ridge 56R that is a continuous one ridge. By forming the ridges to be continuous in this way, at the time of machining the mold for the ridges, there is no need for vertical movement of a blade for mold machining within the range in which the ridges are formed continuously, and the grooves can be machined easily.

As shown in FIG. 4, the first sub-ridges 56A, 56B, 56C, 56D are trapezoidal shapes that gradually become narrower from the bottom surface 48A, and the bottom surfaces thereof are width W4. The width W4 is set within the range of 0.05 to 2.0 mm. Further, the end portion ridges 56E, 56F also are trapezoidal shapes that gradually become narrower from the bottom surface 48A, and the bottom surfaces thereof are the width W4.

A groove portion 53F of groove width M8 is formed between the first main ridge 62E and the first main ridge 52A, and a groove portion 53A of groove width M10 is structured between the first main ridge 52A and the first main ridge 52B, and a groove portion 53B of groove width M12 is formed between the first main ridge 52B and the first sub-ridge 56A. A groove portion 53C of groove width M14 is formed between the first sub-ridge 56A and the first sub-ridge 56B, and a groove portion 53D of groove width M16 is formed between the first sub-ridge 56B and the first sub-ridge 56C, and a groove portion 53E of groove width M18 is formed between the first sub-ridge 56C and the first sub-ridge 56D. With respect to the groove widths of these groove portions, the groove portion 53F is the widest, and the groove widths become more narrow in order toward the first sub-ridge 56D side, and M8>M10>M12>M14>M16>M18.

The second direction ridge pattern 60 has a shape that is similar to the first direction ridge pattern 50, but is disposed as if the first direction ridge pattern 50 is rotated by 90°. Main ridge region 64 and sub-ridge region 68 of the second direction ridge pattern 60 correspond respectively to the main ridge region 54 and the sub-ridge region 58 of the first direction ridge pattern 50. Second main ridges 52E, 62A, 62B, an end portion ridge 62C, and the short connecting ridge 52D of the second direction ridge pattern 60 correspond to the first main ridges 62E, 52A, 52B, the end portion ridge 52C, and the short connecting ridge 62D of the first direction ridge pattern 50. Further, second sub-ridges 66A, 66B, 66C, 66D and end portion ridges 66E, 66F of the second direction ridge pattern 60 correspond to the sub-ridges 56A, 56B, 56C, 56D and the end portion ridges 56E, 56F of the first direction ridge pattern 50. The second main ridges 52E, 62A, 62B and the second sub-ridges 66A, 66B, 66C, 66D extend in a second direction Y that is inclined with respect to the tire radial direction R. A groove portion 63F, a groove portion 63A, a groove portion 63B, a groove portion 63C, a groove portion 63D, a groove portion 63E of the second direction ridge pattern 60 correspond to the groove portion 53F, the groove portion 53A, the groove portion 53B, the groove portion 53C, the groove portion 53D, the groove portion 53E of the first direction ridge pattern 50.

The first direction ridge pattern 50 and the second direction ridge pattern 60 are disposed in the form of a lattice so as to be lined-up alternately at the bottom surface 48A of the decorative recess portion 48, and the entire decorative recess portion 48 is decorated by the first direction ridge pattern 50 and the second direction ridge pattern 60. The short connecting ridge 52D and the first main ridge 62E, and the second main ridge 52E and the short connecting ridge 62D, of the first direction ridge pattern 50 and the second direction ridge pattern 60 that are adjacent to one another are connected together. Due thereto, ridges of the heights H3, H4 are connected as one ridge from the one end to the other end of the decorative concave portion 48, and a continuous main ridge 51 is formed. The continuous main ridge 51 extends in a direction intersecting the tire peripheral direction.

Further, the first sub-ridges 56A through 56D and the second sub-ridges 66A through 66D of the first direction ridge pattern 50 and the second direction ridge pattern 60 that are adjacent to one another form a 90° angle and are adjacent, and form a zigzag sub-ridgeline 61 that is zigzag-shaped. The zigzag sub-ridgeline 61 extends in the same direction as the continuous main ridge 51.

The continuous main ridge 51 and the zigzag sub-ridgeline 61 are disposed alternately in the tire peripheral direction.

As described above, the side decorative band 46 is formed due to the first direction ridge pattern 50, which includes the main ridge region 54 and the sub-ridge region 58 at which the projecting heights of the ridges differ, and the second direction ridge pattern 60, which includes the main ridge region 64 and the sub-ridge region 68, being lined-up alternately with the extending directions of the ridges thereof differing from one another. Due thereto, incident light can be reflected in multiple directions, and the side decorative band 46 can be made to look three-dimensional, and, at the tire side portion, a difference in shading that is due to the difference in the reflection of light (sunlight, ambient light, or the like) can be produced effectively.

Further, the side decorative band 46 has the continuous main ridge 51, which is zigzag-shaped and is structured by the main ridge regions 54, 64, and the zigzag sub-ridgeline 61, which is zigzag-shaped and is structured by the sub-ridge regions 58, 68. Accordingly, incident light can be reflected effectively in more directions, and, at the tire side portion, the difference in shading that is due to the difference in the reflection of light can be produced effectively.

Further, the continuous main ridge 51 is continuous as one ridge from the one end to the other end of the decorative concave portion 48. At the time of machining a mold for forming the first main ridges 52A, 52B, 62E and the second main ridges 62A, 62B, 52E, if the first main ridges 52A, 52B, 62E and the second main ridges 62A, 62B, 52E break-off per ridge pattern, the need arises to carry out vertical movement of the blade for machining, each time a ridge breaks-off. In the present embodiment, the continuous main ridge 51, in which the first main ridges 52A, 52B, 62E and the second main ridges 62A, 62B, 52E are connected and that is continuous from one end to the other end of the decorative concave portion, is formed. Accordingly, vertical movement of the aforementioned blade is unnecessary, and grooves for the main ridges can be machined easily.

Further, at the side decorative band 46, the continuous main ridge 51 and the zigzag sub-ridgeline 61 extend in a direction intersecting the tire peripheral direction U. Accordingly, propagation of cracks that arise easily along the tire peripheral direction U can be suppressed. Moreover, because the continuous main ridge 51 and the zigzag sub-ridgeline 61 are disposed alternately in the tire peripheral direction, these portions can more effectively be made to look three-dimensional by utilizing the difference in the heights.

Further, at the first direction ridge pattern 50 and the second direction ridge pattern 60, the groove width between adjacent ridges becomes gradually more narrow from the side of the first main ridge 52A, the second main ridge 62A toward the first sub-ridge 56D, the second sub-ridge 66D side. Due thereto, an effect that is as if the heights of the ridges are changing within the main ridge region 54, 64 and within the sub-ridge region 58, 68 respectively, can be produced.

Note that, in the present embodiment, at the first direction ridge pattern 50, the groove widths of the groove portions 53A through 53F, which are formed between the first main ridge 52A through the first sub-ridge 56D, are varied. However, as shown in FIG. 5A, the groove widths M8 through M18 may be such that the groove widths of the groove portions 53A, 53B, 53F within the main ridge region 54 are a same width M19, and the groove widths of the groove portions 53C, 53D, 53E within the sub-ridge region 58 are a same width M20. In this case, the groove width M19 of the groove widths 53A, 53B, 53F of the groove portions within the main ridge region 54 is made to be wider than the groove width M20 of the groove portions 53C through 53E within the sub-ridge region 58. Note that the groove widths of the groove portions that are formed between the second main ridge 62A through the second sub-ridge 66D at the second direction ridge pattern 60 can be varied similarly.

Figure 5B:
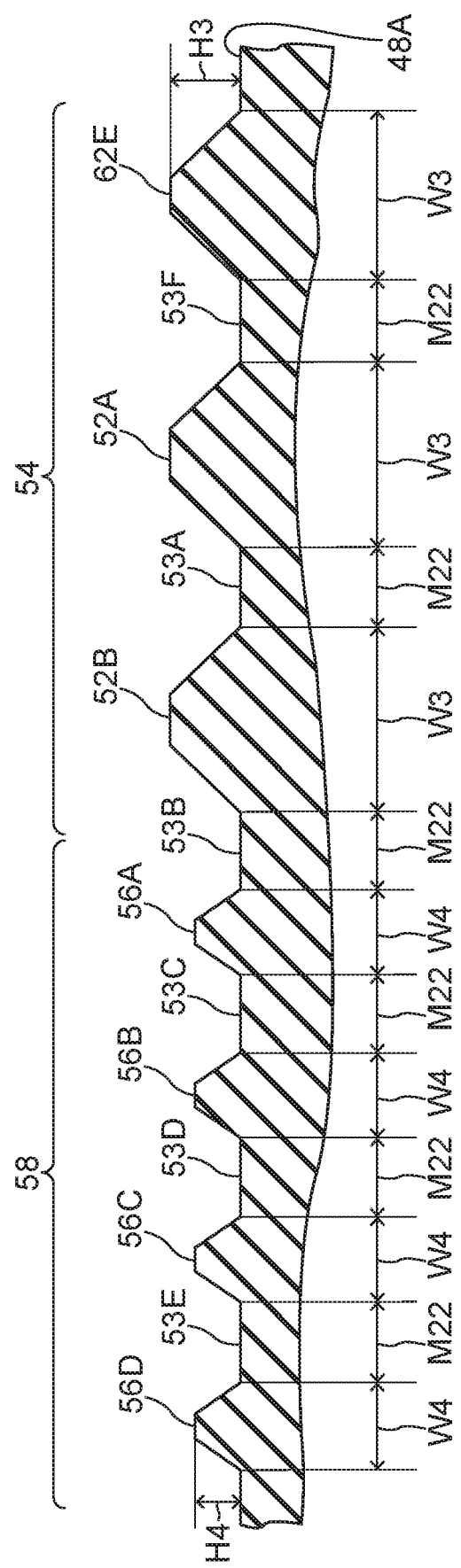
FIG. 5B is a cross-sectional view of a modified example of the side decorative portion of the tire of the present embodiment.

Further, as shown in FIG. 5B, the groove widths M8 through M18 may all be made to be a same width M22. In the present embodiment, because the groove widths vary, incident light can be reflected effectively in more directions, and, at the tire side portion, the difference in shading that is due to the difference in the reflection of light can be produced effectively.

Further, in the present embodiment, at the first direction ridge pattern 50 and the second direction ridge pattern 60, the projecting heights of the ridges are two steps, but the projecting heights may be made to be gradually shorter from the side of the first main ridge 52A, the second main ridge 62A toward the first sub-ridge 56D, the first sub-ridge 66C side.

Moreover, at the first direction ridge pattern 50 and the second direction ridge pattern 60, the projecting heights of the ridges may all be made to be the same. In the present embodiment, because the heights are varied, incident light can be reflected effectively in more directions, and, at the tire side portion, the difference in shading that is due to the difference in the reflection of light can be produced effectively.

Further, in the present embodiment, there is a pattern in which the first direction X and the second direction Y are orthogonal, but the directions do not necessarily have to be orthogonal. Because the angle between the first direction X and the second direction Y is 90°, the difference in shading that is due to the difference in the reflection of the light reflected by the respective ridges can be produced more effectively.

The disclosure of Japanese Application: Patent Application No. 2014-218555 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A pneumatic tire comprising:
a first ridge portion having a plurality of first main ridges, which project out from a bottom surface of a side decorative region formed in a tire side portion and extend in parallel in a first direction, and having a first connecting ridge, which extends in a direction intersecting the first direction and connects together end portions of the first main ridges that are adjacent;
a second ridge portion having a plurality of second main ridges, which project out from the bottom surface of the side decorative region and extend in parallel in a second direction that is different than the first direction, and having a second connecting ridge, which extends in a direction intersecting the second direction and connects together end portions of the second main ridges that are adjacent, and
a plurality of sub-ridges that project out from the bottom surface of the side decorative region, are disposed between the first main ridges and the second main ridges, extend in the first direction or the second direction, and are disposed in parallel to one another;
wherein a plurality of continuous main ridges, in which the first main ridges and the second main ridges are disposed alternately and connected together, and that are continuous from one end to another end of the side decorative region, are formed, and
wherein an interval between the first main ridges that are adjacent to one another and an interval between the second main ridges that are adjacent to one another are wider than an interval between the sub-ridges that are adjacent to one another.

2. The pneumatic tire of claim 1, wherein the first ridge portion and the second ridge portion are disposed alternately in a form of a lattice.

3. The pneumatic tire of claim 1, wherein:
the sub-ridges include first sub-ridges that are disposed at the first ridge portion and second sub-ridges that are disposed at the second ridge portion, and
the first sub-ridges are formed so as to be continuous within the first ridge portion, and the second sub-ridges are formed so as to be continuous within the second ridge portion.

4. The pneumatic tire of claim 1, wherein the first direction and the second direction are orthogonal.

5. A pneumatic tire comprising:
a first ridge portion having a plurality of first main ridges, which project out from a bottom surface of a side decorative region formed in a tire side portion and extend in parallel in a first direction, and having a first connecting ridge, which extends in a direction intersecting the first direction and connects together end portions of the first main ridges that are adjacent;
a second ridge portion having a plurality of second main ridges, which project out from the bottom surface of the side decorative region and extend in parallel in a second direction that is different than the first direction, and having a second connecting ridge, which extends in a direction intersecting the second direction and connects together end portions of the second main ridges that are adjacent, and
a plurality of sub-ridges that project out from the bottom surface of the side decorative region, are disposed between the first main ridges and the second main ridges, extend in the first direction or the second direction, and are disposed in parallel to one another;
wherein a plurality of continuous main ridges, in which the first main ridges and the second main ridges are disposed alternately and connected together, and that are continuous from one end to another end of the side decorative region, are formed, and
wherein projecting heights of the first main ridges and the second main ridges from the bottom surface are higher than that of the sub-ridges.

6. The pneumatic tire of claim 5, wherein the first ridge portion and the second ridge portion are disposed alternately in a form of a lattice.

7. The pneumatic tire of claim 5, wherein:
the sub-ridges include first sub-ridges that are disposed at the first ridge portion and second sub-ridges that are disposed at the second ridge portion, and
the first sub-ridges are formed so as to be continuous within the first ridge portion, and the second sub-ridges are formed so as to be continuous within the second ridge portion.

8. The pneumatic tire of claim 5, wherein the first direction and the second direction are orthogonal.

* * * * *